United States Patent [19]
Schober et al.

[11] Patent Number: 4,953,391
[45] Date of Patent: Sep. 4, 1990

[54] FLAT-TRACK UNIT FOR MOTOR VEHICLE TEST BEDS

[75] Inventors: Karl Schober, Weinstadt; Norbert Schaub, Remseck, both of Fed. Rep. of Germany

[73] Assignee: Daimler-Benz Aktiengesellschaft, Stuttgart, Fed. Rep. of Germany

[21] Appl. No.: 400,732

[22] Filed: Aug. 30, 1989

[30] Foreign Application Priority Data

Sep. 3, 1988 [DE] Fed. Rep. of Germany ....... 3830350

[51] Int. Cl.$^5$ .......................................... G01M 15/00
[52] U.S. Cl. ..................................................... 73/117
[58] Field of Search ...................... 73/117, 117.1, 146, 73/865.6, 123–127

[56] References Cited

U.S. PATENT DOCUMENTS 3,520,180 7/1970 Polhemus et al. ..................... 73/143
4,238,954 12/1980 Langer ................................... 73/146

Primary Examiner—Robert Raevis
Attorney, Agent, or Firm—Evenson, Wands, Edwards, Lenahan & McKeown

[57] ABSTRACT

The invention relates to a flat-track unit for motor vehicle test beds comprising a roadway-simulating belt guided over two rollers. So that skew angles between belt running direction and wheel plane can be realized as close to reality as possible on the test bed, the frame supporting the guide rollers of the belt is pivotably mounted about a vertical axis and is provided with a pivot drive variable in a high-frequency manner. The drive and braking unit for the rollers is arranged so as to be spaced from the flat-track unit and mounted in a fixed position in the vertical direction, while it is displaceable on a circular arc-shaped horizontal guide running concentrically to the vertical axis. A corresponding displacement drive is provided for the drive and brake unit. The latter causes the drive and braking unit to follow, at a comparatively slow speed, the belt running directions of the flat-track unit and on which belt torsional oscillations are superimposed. A universal-joint shaft is arranged between flat-track unit and the drive and braking unit and is held in an approximately straightened position.

19 Claims, 6 Drawing Sheets

FLAT-TRACK UNIT FOR MOTOR VEHICLE TEST BEDS

BACKGROUND AND SUMMARY OF THE INVENTION

The invention relates to a flat-track unit for motor vehicle test beds comprising a roadway-simulating belt which is guided over two rollers and accommodates a vehicle wheel on the upper side and which upper side is orientated roughly horizontally at ground level. The belt is supported in a sliding or rolling manner at the wheel contact region by a supporting shoe. The two rollers are mounted on a frame which in supported in a vertically floating manner as it is mechanically guided in the vertical direction to develop vertical oscillations by a vertically orientated hydraulic cylinder (oscillation exciter) arranged in horizontal projection, roughly in the same position as the wheel contact area. One of the two rollers is connected via a universal-joint and shaft to a drive and braking unit, which is arranged to be vertically immovable and spaced a short distance from the frame. This unit has an output shaft which, on a chronological average, is roughly on the same axis as the one driven roller.

Specification U.S. Pat. No. 3,520,180 shows this general type of test bed.

Flat-track units of this general type are intended to reproduce the rolling relationships of the vehicle wheel on the road in as true to nature manner as is possible on the test bed. In the process, the vehicle wheel stands on a flat contact surface which can be driven, or even braked, to simulate braking or traction forces. In addition, roadway vibrations are simulated by vertical oscillations being imparted to the flat-track unit. Since the belt cannot itself provide a flat contact surface on account of its flexibility, the belt, in the contact region of the vehicle wheel, is supported with a supportive shoe which is flat at the top. The supportive shoe is excited by a vertically disposed excitation cylinder to simulate roadway vibrations. In addition, or instead, the frame supporting the rollers can also be excited independently, or in a superimposed manner, to develop vertical oscillations. In order that the frame can be of particularly light construction, the roller drive is arranged in a fixed position physically separated from the frame, with the separation gap being bridged via a movable universal-joint shaft. It is disadvantageous if one cannot run tests in which a significant transverse force can build up between the roadway-simulating belt and the vehicle wheel.

The object of the invention is to further develop the flat-track unit so that it can also reproduce driving conditions in which a considerable transverse force is built-up between the roadway-simulating belt and the vehicle wheel.

This object is achieved by having the oscillation exciter of the frame comprise a cylinder housing which in firmly secured in position at a foundation in such a way as to resist tilting and rotation. A piston rod in the cylinder is designed as a guide column and is rigidly connected to the frame in terms of rotation and tilting and thus is able to serve as a mechanical vertical guide for the frame. The rod is rotatable and together with the cylinder housing forms a pivot bearing for pivoting the frame about a vertical axis. An oscillation exciter is provided with a pivot drive for pivoting the piston rod and hence the frame about the vertical axis. A universal-joint shaft is connected between the drivable roller and the drive and braking unit, and is provided with length-compensation means having a diameter corresponding to a multiple of the diameter of the universal-joint shaft. The drive and braking unit is attached to a drivable slide which is displaceable on a circular arc shaped horizontal guide running concentrically to the vertical axis. The slide drive is movable as a function of the deflection angle of the universal-joint shaft and is displaced along the circular arc in such direction, as to carry the universal-joint shaft into a straightened position, wherein the drive shaft is at right angles to the axis of the driven roller.

The oscillation exciter used for the vertical excitation also serves as a pivot bearing for mounting the frame about a vertical axis. By means of a separate pivot drive, the frame and the roadway-simulating belt can be angled relative to the wheel plane of the vehicle wheel and this angulation can be subjected to a simulated oscillation which is close to reality. In order that the universal-joint shaft does not need to be angled too sharply relative to the associated braking or drive unit, even at larger angular deviations between belt running direction and wheel plane and under corresponding vibrations, the drive and braking unit is transversible on a circular arc and is provided with a corresponding follow-up drive. This follow-up drive constantly keeps the universal-joint shaft in its approximate straightened position. This design requires that only high-frequency inclination oscillations of relatively small deflection have to be absorbed by the universal-joint shaft.

It is advantageous if the piston rod of the oscillations exciter extend axially on both sides of the piston and is guided over the entire longitudinal extent in the cylinder housing of the oscillation exciter.

It is further desirable if the frame is designed in such a way that its supporting parts are essentially restricted to the area between the bearings of the two belt guiding rollers and the frame mass is concentrated as close as possible to the area around the vertical axis. This is accomplished by having the frame formed by two side cheeks, which are arranged on both sides of the belt to support the bearings for the rollers, and which are connected in the region of the lower belt side by means of two cross-pieces. The two side cheeks (viewed parallel to the roller axes) are, in rough approximation, designed in a trapezoidal shape, or in an extended V-shape.

It is also advantageous if the piston rod is of hollow design and is attached inside the hollow of the piston rod. The pivot drive is designed as a pivoted-piston drive and its output shaft is arranged on the same axis as the piston rod and connected to it so as to be fixed in terms of rotation. The output shaft is also provided with a length-compensation means for compensating vertical changes in the piston rod on account of the excitation or oscillation in the vertical direction.

It is desirable that the circular arc-shaped horizontal guide accommodating the slide extend over such an angular range that (starting from a normal position of the universal-joint shaft orientated transversely to the test-bed longitudinal axis) the slide, by virtue of its contact length on the horizontal guide, is pivotable by ±50°.

Preferably the drive for displacing the slide on the horizontal guide is designed in the form of a rectilinear displacement cylinder with pistons which can be acted upon on both sides. The displacement cylinder, in the normal position of the slide, is orientated roughly tangential to the horizontal guide. The piston rod of the displacement cylinder is designed to be hollow and has a hydraulic cylinder on the inside for accommodating a piston held therein in a fixed position via a piston rod, and wherein the two effective piston areas, located opposite one another, are approximately the same size.

It is further advantageous if the drive for displacing the slide on the horizontal guide is effected by a pinion which can be driven by a hydrostatic motor mounted on the slide for meshing with an arc-shaped toothed rack that follows the horizontal guide.

It is preferred that the length-compensation means for the universal-joint shaft (between the driving roller and the drive or braking unit) is arranged inside the hollow shaft (push-in journal) of the drive and braking unit. The push-in journal is designed as a four-cornered flat sided journal, square in cross-section, and the hollow shaft has a corresponding four-cornered driver in its interior. The four-cornered driver of the hollow shaft has at least four, preferably eight, linear antifriction roller guides having roller circulation in the form of antifriction roller guide shoes, each of which is supported in the wall of the four-cornered driver. Antifriction roller guide shoes are allocated to each flat side of the four-cornered journal with their antifriction rollers bearing under pretension against the flat sides of the four-cornered journal. The hollow shaft having the four-cornered driver is formed by a cylindrical opening in a machine part containing the hollow shaft and into which a bush, cylindrical on the outside and having the four-cornered driver on the inside, can be inserted free from play and can be screwed to the machine part so as to be fixed in terms of rotation. The bush is split along a transverse plane running through the rotational axis and through two opposite edges of the four-cornered journal and is screwed together by tangentially running screws. The bush includes spacer strips, each ground individually to the thickness necessary for the desired antifriction roller pretension and being interposed in the region of the parting surfaces of the bush. The transversely split bush (after it has been assembled with the desired roller pretension, together with the four-cornered journal accommodated in it) is turned on its outside diameter to obtain the desired cross-section to be secured within the cylindrical bush.

Other objects, advantages and novel features of the present invention will become apparent from the following detailed description of the invention when considered in conjunction with the accompanying drawings.

DETAILED DESCRIPTION OF THE DRAWINGS

Figure 1:
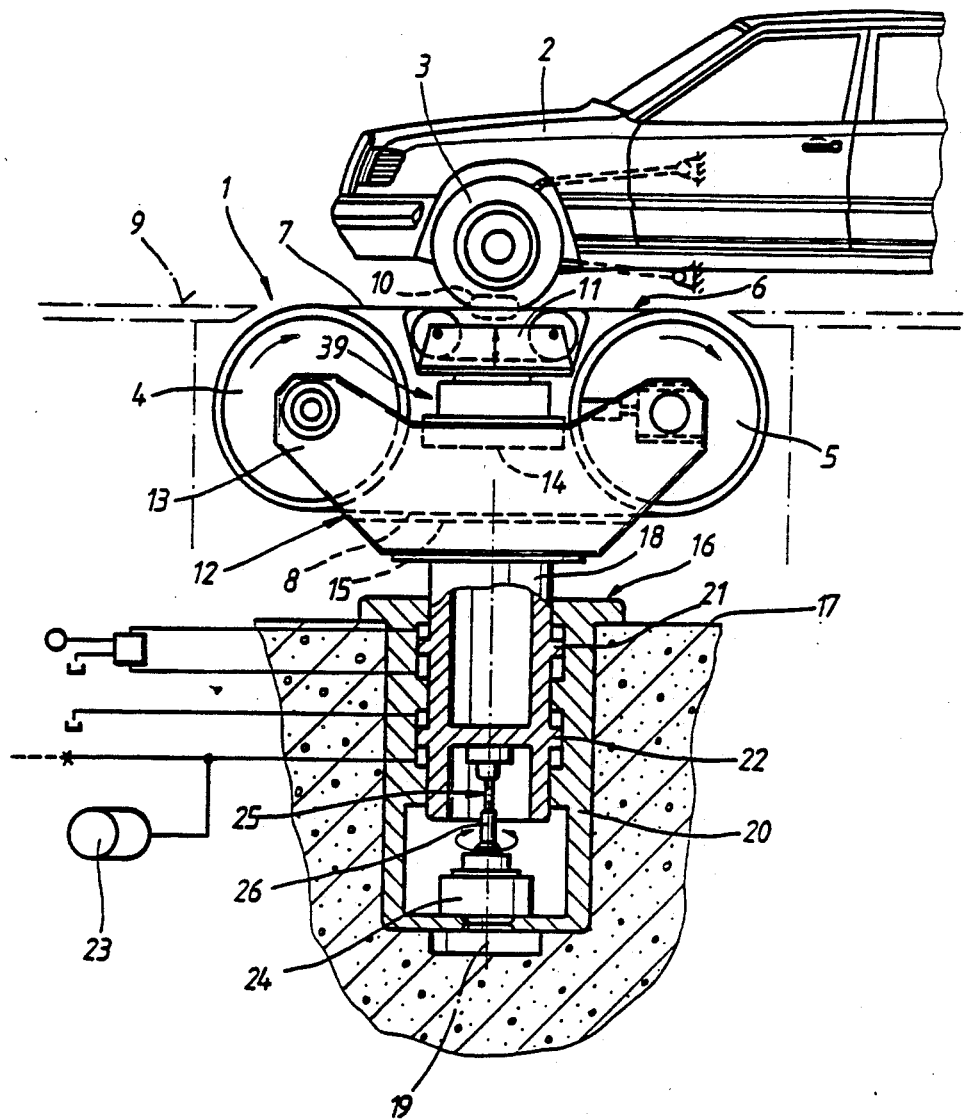
FIG. 1 shows a side view of a flat-track unit with a front wheel of a motor vehicle located thereon.
Figure 2:
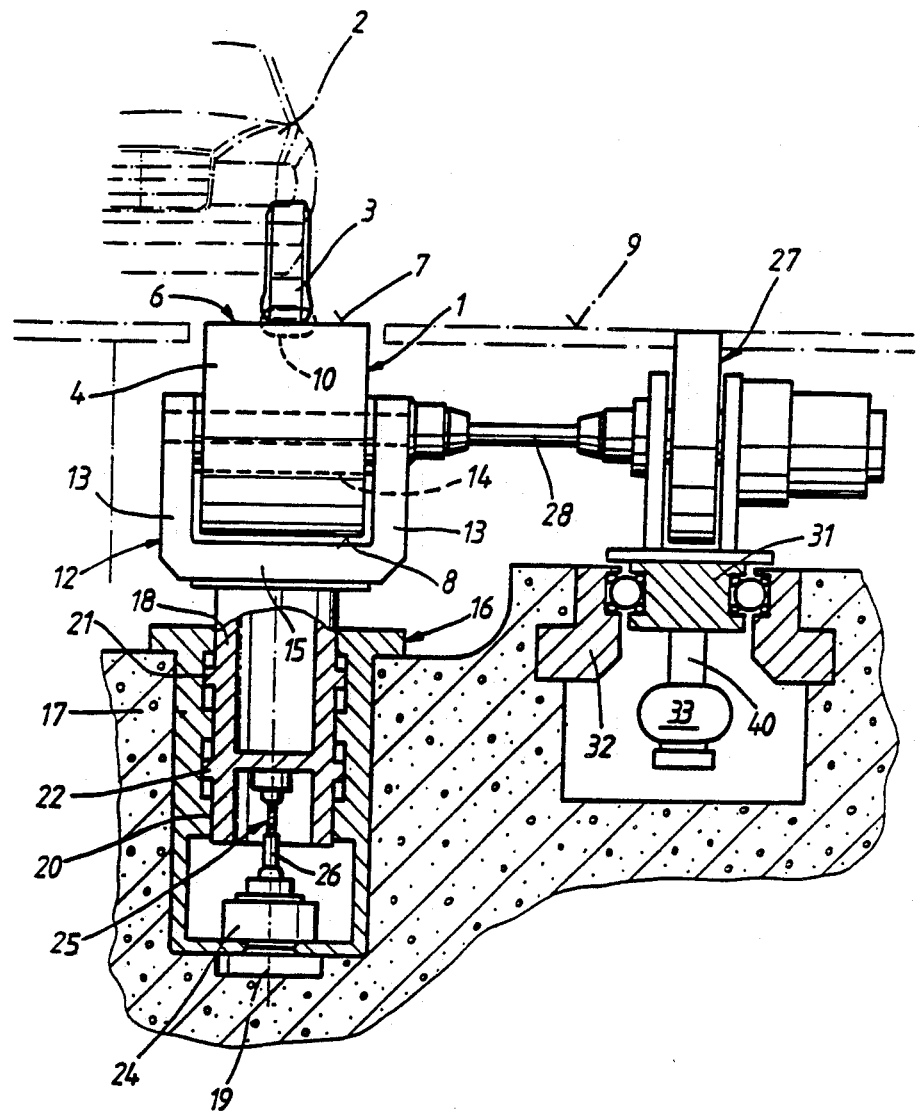
FIG. 2 shows a cross-section through the flat-track unit and through the horizontal guide of the associated drive and braking unit.

The flat-track unit is part of a motor vehicle test bed which is fitted with at least two such flat-track units but preferably with a total of four flat-track units. The flat-track unit has a flexible endless belt 6 which is guided over a driven or braked roller 4 and a non-driven roller 5, which is transversely displaceable for the purpose of tensioning the belt. The belt can be constructed as a steel belt strip which in provided with non-skid surface roughened on its top surface. The two rollers 4 and 5 are held in a frame 12. In addition, the non-driven roller 5 is movable transversely to the roller axis in parallelism relative to the other roller, so that in this way the belt tensioning can be regulated. Apart from a belt-edge regulating means known per se, the rollers are slightly cambered to facilitate constant belt running. The upper side 7 of the belt 6, as it extends between the two rollers 4 and 5, lies roughly horizontally at ground level 9. Placed on the top of the upper side 7 is a vehicle wheel 3 of a vehicle 2. The lower side 8 of the belt lies beneath the two rollers 4 and 5. In the contact region 10 of the vehicle wheel 3, the upper side 7 of the belt is supported by a supporting shoe 11, over which the upper side 7 of the belt can slide or roll at low resistance. Supporting units of this type, which often also function as hydrostatic flat bearings, are known per se. In this regard attention is drawn to applicants' copending application Serial Number (applicants' attorney docket No. 25/34038) entitled "Flat-Track Unit for Motor Vehicle", filed on an equal date, and which is hereby incorporated by this reference into the instant application.

To excite the upper side 7 of the belt in a high-frequency manner to develop oscillations of low amplitude, the supporting shoe 11 is coupled to an excitation cylinder 39 which guides it mechanically in the vertical direction. The two rollers 4 and 5 are mounted in a frame 12 which is supported in a vertically floating manner and guided mechanically in the vertical direction. In this arrangement, the frame is supported via a hydropneumatic spring mounting which absorbs the proportionate dead weight of the flat-track unit 1 as well as the wheel load. To simulate drive and brake forces on the vehicle wheel 3, one of the two rollers, namely the roller 4, can be driven or braked. So that the flat-track unit 1 can be designed to be as light as possible (it is to be excited to develop vertical oscillations), the drive and braking unit 27 serving to drive the roller 4 is arranged so as to be supported at a fixed position spaced from the roller 4, i.e. arranged to be vertically immovable. The drive and braking unit is connected to the roller 4 via a universal-joint shaft 28.

Apart from a vertical excitation of the upper side 7 of the belt 6 by the excitation cylinder 39, the entire frame 12 is also excited to develop oscillations in the vertical direction so that low-frequency and large-amplitude roadway vibrations can thus be simulated. For this purpose, the frame 12 is coupled to an oscillation exciter 16 which consists of a cylinder housing 20 and a piston rod 18. The associated cylinder housing is firmly embedded in the foundation 17 so as to resist tilting. On the other side, the piston rod 18 is connected to the frame 12 so as to be fixed in terms of rotation and so as to resist tilting.

The oscillation-exciter is located at the same position as the contact area 10 of the vehicle wheel 3 on the belt 6 to form a stable mechanical vertical guide. The frame can be hydraulically excited to develop the mentioned vertical oscillations by a first annular piston 21 which runs collar-like around the outer periphery of the piston rod 18 and to which a pressure space in allocated on each of two sides of the piston. The proportionate dead weight of the flat-track unit and the wheel load are absorbed by a second annular piston 22 which likewise encircles the piston rod 18 in a collar-like manner and to which a pressure space, at least at the bottom, is directed. The bottom pressure space of the second annular piston 22 is connected to a gas-pressure accumulator 23 which keeps the requisite pressure approximately uniform, irrespective of the spring deflection state of the oscillation exciter. The hydropneumatic spring mentioned above is formed in this way.

So that the flat-track unit can also be pivoted horizontally relative to the wheel plane of the vehicle wheel 3, the piston rod 22 is not only mounted so as to be axially displaceable in a vertical direction in the cylinder housing 20, but also to be readily rotatable therein so that the sliding combination formed by cylinder housing 20 and piston rod 18 can also serve as a pivot for the frame about a vertical axis 19.

Thus, the cylinder housing 20 acts as a mechanical vertical guide and a pivot for the frame 12 about the vertical axis 19. A pivot drive 24 for pivoting the frame 12 about this vertical axis 19 is located on the same axis as the hollow piston rod 18. The pivot drive 24 is designed in the form of a pivoted-piston drive. Since the piston rod 18 performs vertical strokes to provide the necessary vertical oscillations, the output shaft 25 of the pivot drive 24 is provided with a length-compensation means 26.

The flat-track unit is to be pivotable not only in a stationary manner relative to the wheel plane of the vehicle wheel 3, but also in a moving manner, since in practice, i.e. during the road operation of normal vehicles, the angle of inclination which occurs between wheel Plane and translational direction of the wheel center point is subject to relatively high-frequency fluctuations. By the joint vertical and pivotal movement, it is possible for a high-frequency inclination vibration to be superimposed on the set pivot angle. In order that the required torque is kept as low as possible, the flat-track unit is not only constructed to be as light as possible, but the construction is designed in such a way that the masses lie as close as possible to the vertical axis 19. That is, the polar mass moment of inertia related to the vertical axis 19 is kept as small as possible. This is another reason for having the piston rod 18 be hollow. However, the construction of the frame 12 makes a very considerable contribution in this connection. The frame 12 is designed such that its supporting parts are essentially restricted to the area between the bearings of the two belt-guiding rollers 4 and 5. This is achieved by having the frame 12 being formed by two side cheeks 13 which are arranged on both sides of the belt 6 to support the bearings for the rollers and connected by two cross-pieces 14 and 15 in the region of the lower belt side 8. The upper, shorter cross-piece 14 lies inside the belt loop and serves to support the excitation cylinder 39 for the supporting shoe 11. The lower, longer cross-piece 15 lies outside the belt loop and serves to support the frame 12 on the piston rod 18. In order to construct the frame to be as light as possible overall and with a mass moment of inertia which is as small as possible with regard to the vertical axis 19, the two side cheeks 13 (viewed parallel to the roller axis) are designed in a trapezoidal extended V-shape.

Additionally, the drive and braking unit 27 is moved outwardly and is arranged in a fixed position in the vertical direction thus keeping weight off the vertical frame 12. The moving torque connection, between the drivable roller 4 and drive and braking unit 27, is obtained through the universal-joint shaft 28, which not only has to absorb corresponding vertical differences during vertical oscillation of the flat-track unit 1, but also has to compensate for a corresponding inclination of the connected axes during the above-mentioned pivoting of the belt 6 relative to the wheel plane in horizontal projection. Since the universal-joint shaft 28 lies eccentrically relative to the vertical axis 19, a variation in distance (between the drivable roller 4 and drive or braking unit 27) occurs upon pivoting of the frame 12. This variation in distance is substantially greater than the change in length of the universal-joint shaft 28 caused by a vertical excitation of the flat-track unit. For this reason, the universal-joint shaft 28 is also provided with a length-compensation means which is of very generous dimensions and whose longitudinal stroke corresponds to a multiple of the diameter of the universal-joint shaft. This length-compensation means is located in the interior of the drive and braking unit 27. This shaft 30 of the drive and brake unit 27 is hollow to accept a push-up journal 29 of the universal-joint shaft 28 in an axially sliding manner but is fixed thereto in terms of rotation. Here, suitable design measures ensure that free axial play of the push-in journal 29 in the hollow shaft 30 is possible even under high torque loads. For the sake of completeness, it should also be mentioned that the universal-joint shaft 28 must have homokinetic shaft joints, since the two shaft joints are in no way angled symmetrically in mirror image.

In order that high torque can be obtained at high speeds at the drivable roller 4, the deflection angles of the universal-joint shaft 28 and its shaft joints should not exceed a certain relatively small angular amount of, for example 5°. Nonetheless, so that relatively high skew angles can be permitted between the roadway-simulating belt 6 and the wheel plane, the drive and braking unit 27 is attached on a drivable slide 31. The slide 31 is displaceable on a circular arc-shaped horizontal guide 32 that extends concentrically to the vertical axis 19.

A displacement cylinder 33 drives the drivable slide 31 as a function of the deflection angle of the universal-joint shaft 28 in such a direction that the universal-joint shaft 28 is returned into its straightened position. Due to such a construction of the slide drive, the drive and braking unit 27 follows the flat-track unit 1 in the pivoting direction. High-frequency torsional oscillations having a relatively small amplitude are absorbed by the pivot drive 24. Therefore, it is not necessary for the drive and braking unit 27 to follow these small oscillations. The drive and braking unit follows this movement only when the average position of these oscillations causes long-term shifting in one or the other direction. This follow-up movement (compared with the high-frequency torsional oscillation on the part of the pivot drive 24) can take place relatively slowly, but extends over large angular spaces.

In practice, skew angles occur within the limit range of ground adhesion of up to about 20°. The pivoting range of the horizontal guide 32 (or the slide 31 guided thereon) in the order of magnitude of about ±20° would therefore be suitable for the flat-track units allocated to non steerable vehicle axles. In order that one can have tests that can be beyond the limit range, a certain extension of the pivoting range beyond this 20° angularity would be logical. In order that tests, which are close to reality, can be run with belt skew angle on turned vehicle wheels of steerable vehicles, it is logical to be able to pivot the flat-track units, which are allocated to a steerable vehicle axle, by at least ±50°. In view of the contact length of the slide 31 on the horizontal guide 32, this requires relatively long guideways on the horizontal guide 32.

Figure 3:
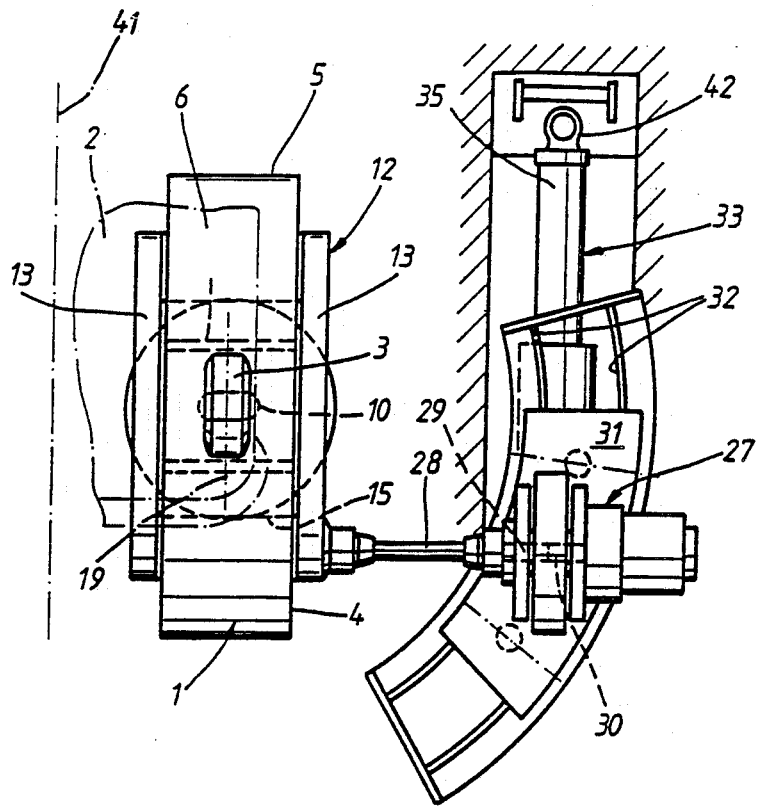
FIG. 3 shows a plan view of the braking unit according to FIGS. 1 and 2.

The slide drive displacement cylinder 33 is vertically located below the arc-shaped horizontal guide 32. In the normal position of the slide 31 (FIG. 3), the universal-joint shaft 28 protrudes transversely at right angles from the test-bed axis 41 and the rectilinear displacement cylinder 33 is roughly tangential to the horizontal guide 32 and roughly parallel to the longitudinal axis 41 and the test bed. In accordance with the arc-shaped path of the horizontal guide 32, the displacement cylinder 33, depending on the deflection of the slide 31 from this normal position, assumes a more or less sharply inclined position relative to the initial position shown. For this reason, the displacement cylinder 33 is pivotably articulated both on the pivot lug 42 at the foundation 17, as well as on the pivot pin 40 connected to the slide 31. This permits corresponding angular displacements. The pivot pin 40 on the slide 31 is attached in the area of the center of gravity of the slide 31 and of the drive and braking unit 27.

Figure 4:
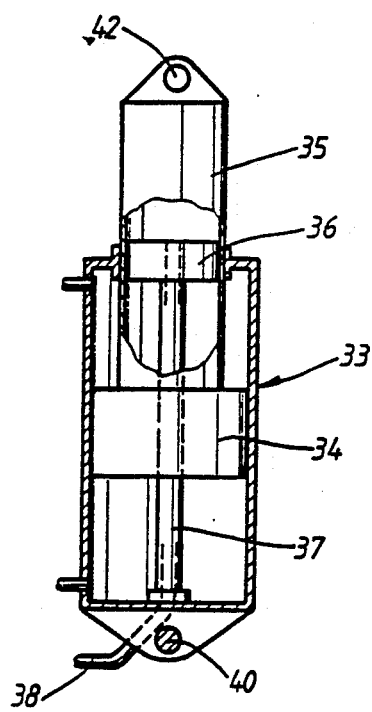
FIG. 4 shows a diagrammatic detail representation of the displacement drive for the slide, designed as a differential cylinder.

So that the slide 31 can be moved in both directions as rapidly as possible, the displacement cylinder 33 is provided with a piston 34 which can be acted upon on both sides. In order that effective piston areas, which are approximately the same size, and accordingly displacement velocities which are approximately the same, can be realized for both displacement directions at a predetermined delivery quantity and in order to obtain an overall length of the displacement cylinder 33 which is as short as possible, the displacement cylinder 33 can be designed as a double acting piston cylinder (FIG. 4). The piston rod 35 is connected to piston 34, which can be acted upon on both sides, and is designed to be hollow to provide a hydraulic cylinder on its inside. Piston 36, which is held in a fixed position via a piston rod 37, is located inside the hollow piston rod 35. The outside diameter of the piston rod 35 and the inside diameter of the cylinder formed in it differ only slightly in accordance with the relatively small wall thickness of the piston rod 35. The two opposite effective piston areas of piston 34 consequently differ merely by the cross-section of the cylindrical wall of the piston rod 35, since the space situated above the fixed piston 36 (FIG. 4) is vented to the outside via a vent connection 38 so that this space can be enlarged and reduced without impairment, and the space below the piston 36 is connected to the space above piston 34. Owing to such a construction of the displacement cylinder 33, the slide 31 can be displaced over large displacement paths in both directions at approximately the same velocity, or with approximately the same requisite working-oil quantity; nonetheless, the displacement cylinder 33 has a relatively short overall length.

In another type of connection for the pistons, with the pistons being of appropriate size, the effective piston areas can also be made identical. Here each of the two pistons 34 and 36 would be hydraulically acted upon merely on one side, namely the upper side according to FIG. 4, with the common space located below the two pistons 34 and 36 being vented. The full area of the smaller piston 36 and the annular upper area of the larger piston 34 are then effective to act functionally in opposite directions to one another, despite the fact that these piston areas are both located at the top. Both pistons 34 and 36 can be dimensioned independently of one another in their effective piston area; that is, they can also be constructed to be exactly the same size.

Instead of a linear drive for the slide 31 by a displacement cylinder, such a drive can be realized by a rack-and-pinion 55 railway. A pinion would be mounted on the slide 31 and would be driven by a motor. The piston would mesh with an arc-shaped toothed rack which follows the horizontal guide or is made directly part of the horizontal guide. Preferably the piston can be driven by a hydrostatic motor, which, owing to the high hydrostatic working pressures even at high drive power, has very small outside dimensions.

Figure 5:
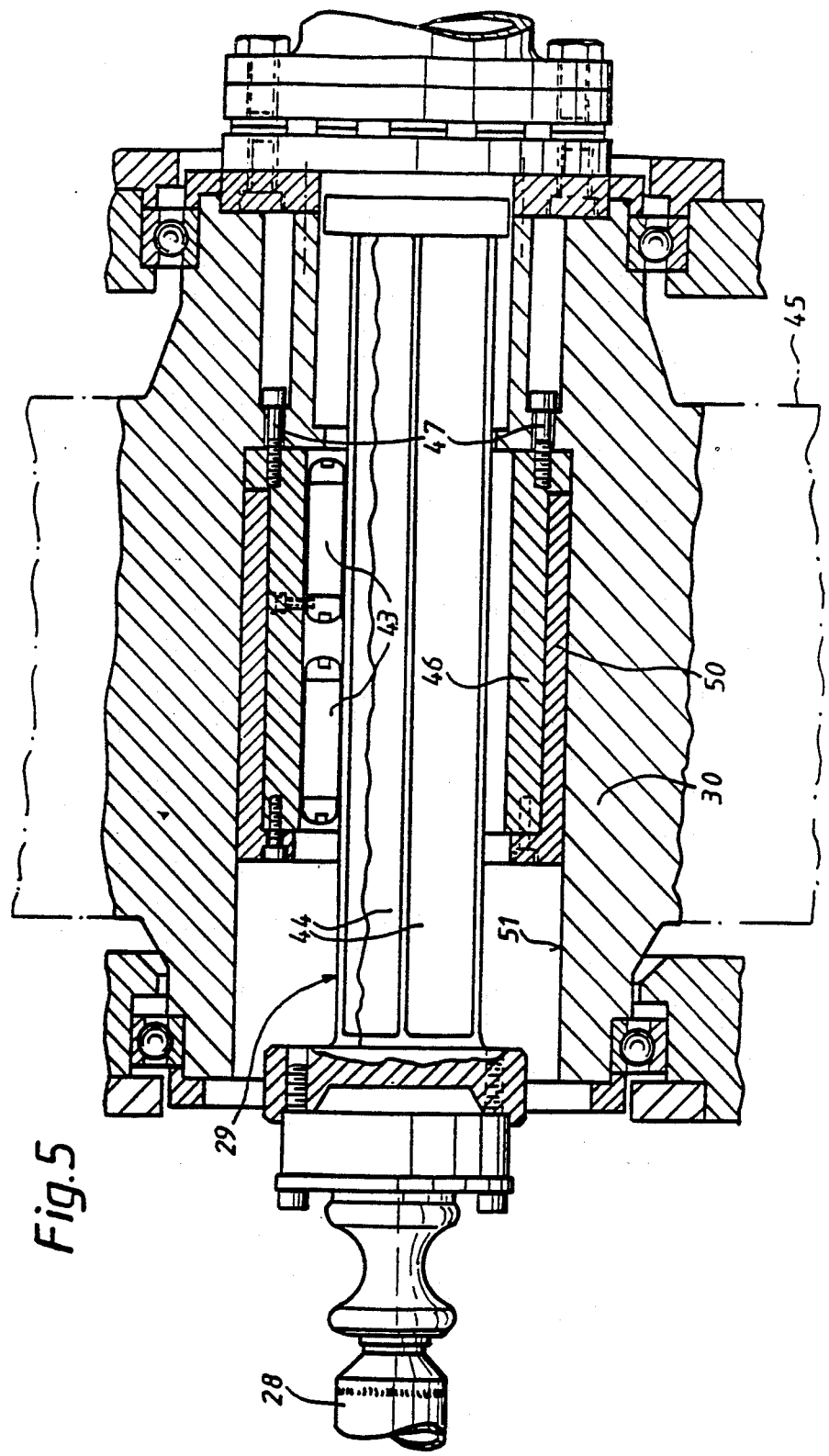
FIG. 5 shows an enlarged longitudinal section through the length-compensation means for the universal-joint shaft, integrated in the hollow shaft of the drive and braking unit.
Figure 6:
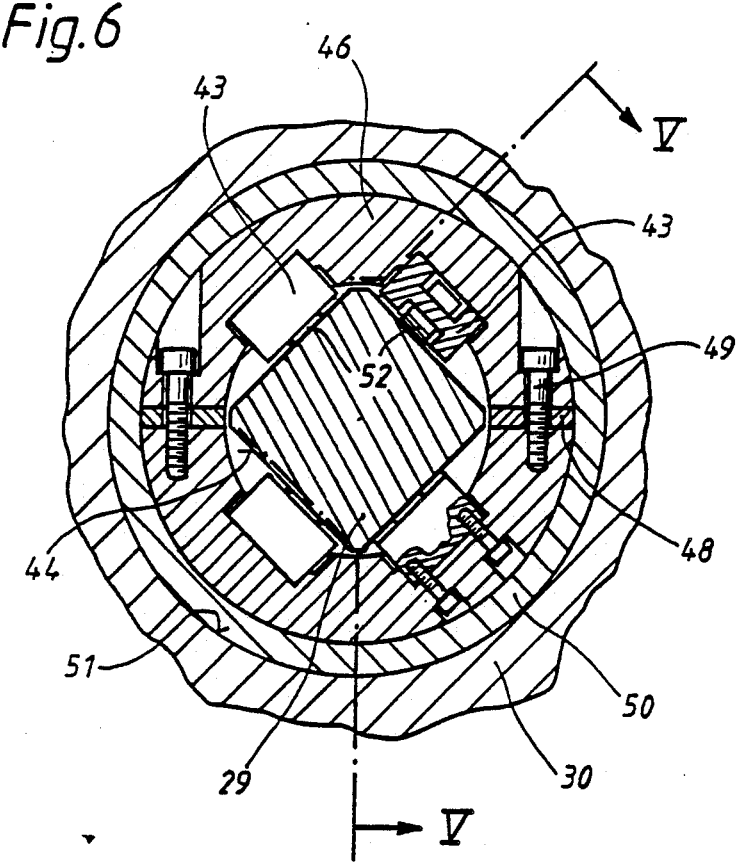
FIG. 6 shows a cross-section through the four-cornered driver of the push-in journal of the length-compensation means according to FIG. 5.
Figure 7:
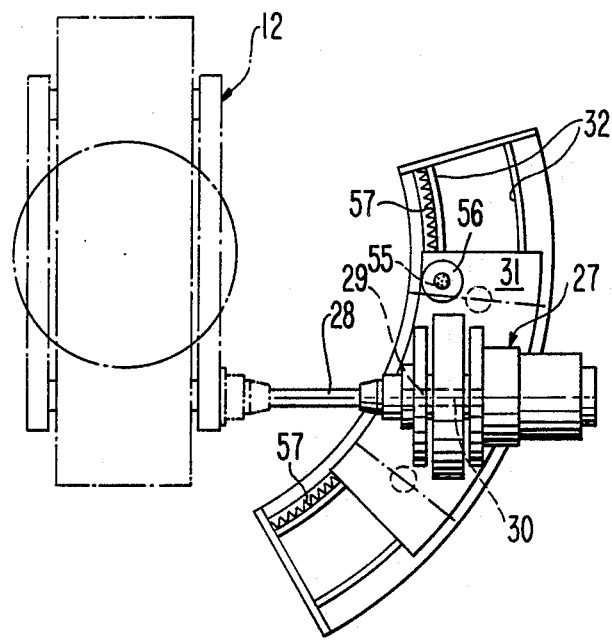
FIG. 7 shows a modified drive for the slide.

The length-compensation means for the universal-joint shaft 28 (see FIGS. 5 and 6) is located in the interior of the drive and braking unit 27, provided with a hollow shaft 30. It must be possible for the push-in journal 29 to be axially movable in a free smooth-running manner in the hollow shaft under all loading conditions so that there is no deflection in the guidance of the push-in journal and so that changes in distance can be freely compensated. A convenient initial design for solving this problem provides for the push-in journal 29 to be designed as a four-cornered journal (square in cross-section) and having flat sides 44. The hollow shaft 30 has a corresponding four-cornered cross-section in its interior. In order that the four-cornered journal can be guided in an axially smooth-running manner but free from play, antifriction roller guide shoes 43 are provided interiorally of the shaft 30. Each antifriction roller guide shoe 43 has antifriction rollers 52 in in endless closed guide channel. At least four, but preferably eight, linear antifriction roller guides are provided. At least one antifriction roller guide shoe 43, but preferably two, are in each came allocated to each flat side 44 of the four-cornered journal. The antifriction roller guide shoe 43, includes antifriction rollers 52 and guide channels for the antifriction rollers 52, is a component which is roughly H-shaped in cross-section. The channel root of one guide channel, together with one flat side 44 each of the four-cornered journal, forms an antifriction surface pair. The base surface of this guide channel must therefore be accurately machined and orientated exactly parallel to the flat side 44 of the four-cornered journal. The approximately H-shaped support part transmits the forces from the four-cornered journal to the wall of the four-cornered driver, so that torque can be transmitted in both directions, free from play from the four-cornered journal and into the four-cornered driver even under peak loads. The antifriction rollers 52 of the antifriction roller guide shoes 43 must be fitted under pretension. The pretension must be selected to be so large that, even under the peak torque normally occurring, it does not quite fall to zero, even on the side relieved of load. The pretension must not be set arbitrarily high, since otherwise the antifriction roller guide will be damaged relatively early on, due to overloading and material fatigue. Additionally, the smooth-running capacity of the axial guide would consequently suffer.

In order that the four-cornered driver can be manufactured independently of the machine part 45 carrying it, a cylindrical opening 51 having a high true-running accuracy is made in the hollow shaft 30 of the machine part 45. A bush 46, cylindrical on the outside and containing the four-cornered driver on the inside, is inserted free from play into the opening 51, and then screwed to the machine part 45 by screws 47 so as to be fixed in terms of rotation. To set the pretension of the antifriction roller guide shoe in a defined manner, the bush 46 is split alone a transverse plane running through the rotational axis and through two opposite edges of the four-cornered journal. The bush 46 is screwed together by means of tangentially running screws 49. Spacer strips 48 are interposed in the region of the parting surface of the transversely split bush 46. The spacer strips 48 are around individually to the thickness required for the desired pretension of the rolling contact bearing. In this respect, the assembly state in which the longitudinal guide runs just free from play but without significant pretension is first of all empirically determined by repeatedly interposing shims finely graduated in thickness. The requisite pretension determined by calculation, compared with the state which is just free from play, can be brought about by the spacer strips 48 having a defined undersize relative to the insertion strips for the state which is free from play. The spacer strips 48 are ground to this size. The two halves of the bush 46, together with the spacer strips 48, are then pinned and screwed by a defined tightening torque being applied. In this ready-assembled state, the bush 46 is then turned cylindrically on the outside diameter. The associated four-cornered journal supports the unit during the turning operation. The four-cornered journal is accommodated between centers in a lathe. This ensures that the outer periphery of the bush 46 runs exactly concentrically relative to the rotational axis of the four-cornered journal. In order that bush 46 can be even better secured against deformations, a further cylindrical bush 50 is pressed onto the transversely split bush 46 and is axially screwed to it at an end face via an inwardly projecting collar. The outside diameter of the bush 50 corresponds to the inside diameter of the cylindrical opening 51 in the hollow shaft 30. The two dimensions are adapted to fit one another with a light interference fit.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed

1. A flat-track unit for motor vehicle test beds, comprising:
    a roadway-simulating belt which is guided over two rollers for accommodating a vehicle wheel on a top on its upper side;
    the top of the upper side of the belt is orientated roughly horizontally at ground level and is supported in a sliding or rolling manner at a wheel contact region by a supporting shoe;
    the two rollers are mounted in a frame which is supported in a vertically floating manner and is mechanically guided in the vertical direction;
    excitement means are provided to develop vertical oscillations in the frame;
    the excitement means including a vertically orientated hydraulic cylinder and a cylinder housing locating roughly in line with wheel contact region;
    one of the two rollers is connected via a universal-joint shaft to a drive and braking unit which is arranged to be vertically immovable and is spaced at a distance from the frame;
    the drive and breaking unit is provided with an output shaft which is aligned with a roller axis of the one roller;
    wherein the hydraulic cylinder of the excitement means is firmly secured on a foundation to resist tilting and rotation and has a piston and piston rod rigidly connected to the frame in terms of rotation and tilting to act as a mechanical vertical guide for the frame;
    said piston being rotatable together with the cylinder housing forming a pivot bearing for pivoting the frame about a vertical axis;
    a pivot drive means for pivoting the piston rod and its rigidly connected frame about the vertical axis;
    wherein said universal-joint shaft between the one roller and the drive and braking unit is provided with length-compensation means having a diameter corresponding to a multiple of the diameter of corresponding to a multiple of the diameter of the universal-joint shaft;
    wherein the drive and braking unit is attached to a drivable slide which is displaceable along a circular arc-shaped horizontal guide running concentrically to the vertical axis; and wherein there is
    a drivable slide means for displacing the drivable slide as a function of a deflection angle of the universal-joint shaft to position the universal-joint shaft into a straightened position between the drivable slide an the one roller.

2. A flat-track unit according to claim 1, wherein the frame has its mass substantially located in the area between bearings of the two belt-guiding rollers and is concentrated as close as possible to the area around the vertical axis.

3. A flat-track unit according to claim 2, wherein the frame comprises two side cheeks, one arranged on each side of the belt for supporting the bearings of the two rollers and connected by two cross-pieces in a region of a lower belt side.

4. A flat-truck unit according to claim 3, wherein the two side cheeks are designed in one of a trapezoidal shape and on an extended V-shaped as viewed parallel to the roller axes.

5. A flat-track unit according to claim 1, wherein the piston rod extends axially on both sides of the piston and is guided in the cylinder housing.

6. A flat-track unit according to claim 5, wherein the piston rod is hollow.

7. A flat-truck unit according to claim 6, wherein the pivot drive means for pivoting the frame is located inside the hollow piston rod as viewed in the vertical direction.

8. A flat-track unit according to claim 7, wherein the pivot drive means is a piston motor.

9. A flat-track unit according to claim 7, wherein an output shaft of the pivot drive means is arranged on the same axis as the piston rod and is non-rotatably connected to it with a length-compensation means for compensating for vertical changes of the piston rod which produces oscillation of the frame in the vertical direction.

10. A flat-track unit according to claim 1, wherein the circular arc-shaped horizontal guide has a length that extends over such an angular range that the slide, is pivotable by ±50°.

11. A flat-track unit according to claim 1, wherein the drivable slide means comprises a rectilinear displacement cylinder having a piston which can be acted upon on both sides; and wherein said displacement cylinder is orientated roughly tangental to the horizontal guide in the normal position of the slide.

12. A flat-track unit according to claim 11, wherein a hollow piston rod is connected to the piston of the drivable slide means, and has a hydraulic cylinder on the hollow inside for accommodating a second piston held in a fixed position via a piston rod;

so that both said sides of said drivable slide means piston are approximately the same size.

13. A flat-track unit according to claim 1, wherein the drivable slide means for displacing the slide on the horizontal guide comprises a pinion which is driven by a hydrostatic motor mounted on the slide and which meshes with an arc-shaped toothed rack of the horizontal guide.

14. A flat-track unit according to claim 1, wherein the length-compensation means for the universal-joint shaft, between the driven roller and the drive or braking unit, is located inside a hollow shaft of the drive and braking unit.

15. A flat-track unit according to claim 14, wherein the length-compensation means, located inside the hollow shaft, comprises a four-cornered journal which is square in cross-section; and wherein the hollow shaft of the drive and braking unit has a corresponding four-cornered driver in its interior.

16. A flat-track unit according to claim 15, wherein the four-cornered driver of the hollow shaft comprises at least four linear antifriction rollers, each mounted on a antifriction roller guide shoe; and wherein each of said four antifriction rollers is prestressed against each flat side of the four-cornered journal.

17. A flat-truck unit according to claim 16, wherein the hollow shaft of the four-cornered driver is formed by a cylindrical opening in a slide machine part carrying the driver and contains a bush, cylindrical on the outside and having the four-cornered driver configuration on the inside; and wherein said bush being freely insertable into the opening and screwed to the slide machine part so as to be fixed in terms of rotation.

18. A flat-track unit according to claim 17, wherein the bush is split along a transverse plane running through a rotational axis of the hollow shaft and through two opposite corners of the four-cornered journal; and wherein said bush is screwed together by tangentially running screws; and spacer strips ground individually to the thickness necessary for the desired antifriction roller pretension and being interposed in the region of the parting surfaces of the bush.

19. A flat-track unit according to claim 18, wherein the transversely split bush after it has been assembled to obtain the desired roller pretension with the four-cornered journal, accommodated in it, is secured within a further cylindrical bush.

* * * * *